United States Patent
Schroeder et al.

(10) Patent No.: US 9,975,535 B1
(45) Date of Patent: May 22, 2018

(54) COMPONENT BRACKET AND COVER

(71) Applicant: Honda Motor Co., Ltd., Tokyo (JP)

(72) Inventors: Dustin M Schroeder, Milford Center, OH (US); Jason A Sovern, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days. days.

(21) Appl. No.: 15/357,606

(22) Filed: Nov. 21, 2016

(51) Int. Cl.
| | |
|---|---|
| *B60T 8/32* | (2006.01) |
| *B60T 17/02* | (2006.01) |
| *B60R 16/02* | (2006.01) |
| *B60T 17/18* | (2006.01) |
| *B62D 29/00* | (2006.01) |

(52) U.S. Cl.
CPC .......... *B60T 17/02* (2013.01); *B60R 16/0215* (2013.01); *B60T 17/18* (2013.01); *B60Y 2200/20* (2013.01); *B62D 29/007* (2013.01); *B62D 29/008* (2013.01)

(58) Field of Classification Search
CPC ........ B60T 17/02; B60T 17/00; B60T 8/3685; B60T 8/3675; B60Y 2200/20
See application file for complete search history.

(56) References Cited

U.S. PATENT DOCUMENTS

| | | | |
|---|---|---|---|
| 6,158,829 A * | 12/2000 | Nielsen .................. | A47B 46/00 312/208.1 |
| 6,386,650 B2 | 5/2002 | Kouzuki | |
| 7,427,114 B2 | 9/2008 | Ohishi et al. | |
| 7,669,680 B2 | 3/2010 | Hasegawa | |
| 7,769,519 B2 * | 8/2010 | Kamiya .................. | B60T 8/171 303/139 |
| 8,002,066 B2 | 8/2011 | Harada | |
| 8,511,929 B2 * | 8/2013 | Raye ......................... | B60T 7/20 248/220.22 |
| 9,649,924 B2 * | 5/2017 | Nakaoka .................. | B60K 5/04 |
| 2008/0157447 A1 * | 7/2008 | Sobajima ................ | F16F 15/08 267/141.1 |
| 2010/0071985 A1 * | 3/2010 | Harada ................ | B60T 8/3685 180/219 |
| 2010/0263368 A1 * | 10/2010 | Gnamm ............... | B60T 8/3685 60/592 |

FOREIGN PATENT DOCUMENTS

JP 2012126261 A 7/2012

* cited by examiner

*Primary Examiner* — Brian L Swenson
(74) *Attorney, Agent, or Firm* — Honda Patents & Technologies North America, LLC; Mark E. Duell

(57) ABSTRACT

A motor vehicle having a tubular frame, an engine, and a brake modulation system comprising sensors and a modulator includes a bracket that includes a bracket body, at least one body attachment point, and at least one bracket fastener for attaching the bracket body to the tubular frame at the at least one body attachment point. The motor vehicle also includes a cover that includes a cover body, at least one cover attachment point, at least one cover fastener for attaching the cover body to the bracket at the at least one cover attachment point, and wherein the modulator is attached to the bracket and is covered by the cover.

10 Claims, 12 Drawing Sheets

SECTION A-A

COMPONENT BRACKET AND COVER

TECHNICAL FIELD

The embodiments disclosed herein are related to the field of brackets for mounting components and covers or shields for protecting the components.

BACKGROUND

In the past, motor vehicles such as all-terrain vehicles (ATVs) or side by side (SxS) vehicles have not featured brake modulating systems, including brake modulators. In order to apply a brake modulating system, a modulator must be attached to a tubular frame. Therefore, there is a need for an improved mounting bracket that protects the modulator from rock and debris thrown off the tires while traveling off road.

APPLICATION SUMMARY

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

According to one aspect, a motor vehicle having a tubular frame, an engine, and an anti-lock braking system comprising sensors and a modulator includes a bracket that includes a bracket body, at least one body attachment point, and at least one bracket fastener for attaching the bracket body to the tubular frame at the at least one body attachment point. The motor vehicle also includes a cover that includes a cover body, at least one cover attachment point, at least one cover fastener for attaching the cover body to the bracket at the at least one cover attachment point, and wherein the modulator is attached to the bracket and is covered by the cover.

According to another aspect, a motor vehicle having a tubular frame, an engine, and a component system comprising a harness and a component includes a bracket and a cover attached to the bracket for covering the component.

According to yet another aspect, a motor vehicle has a tubular frame, an engine mounted to a first portion of the tubular frame, and a component system including a wire harness and a component. The motor vehicle further includes a bracket attached to a second portion of the tubular frame, a cover, and wherein the component is attached to the bracket and is covered by the cover.

The figures depict various views of the embodiments for purposes of illustration only. One skilled in the art will readily recognize from the following discussion that alternative embodiments of the structures and methods illustrated herein may be employed without departing from the principles of the embodiments described herein.

DETAILED DESCRIPTION

Figure 1:
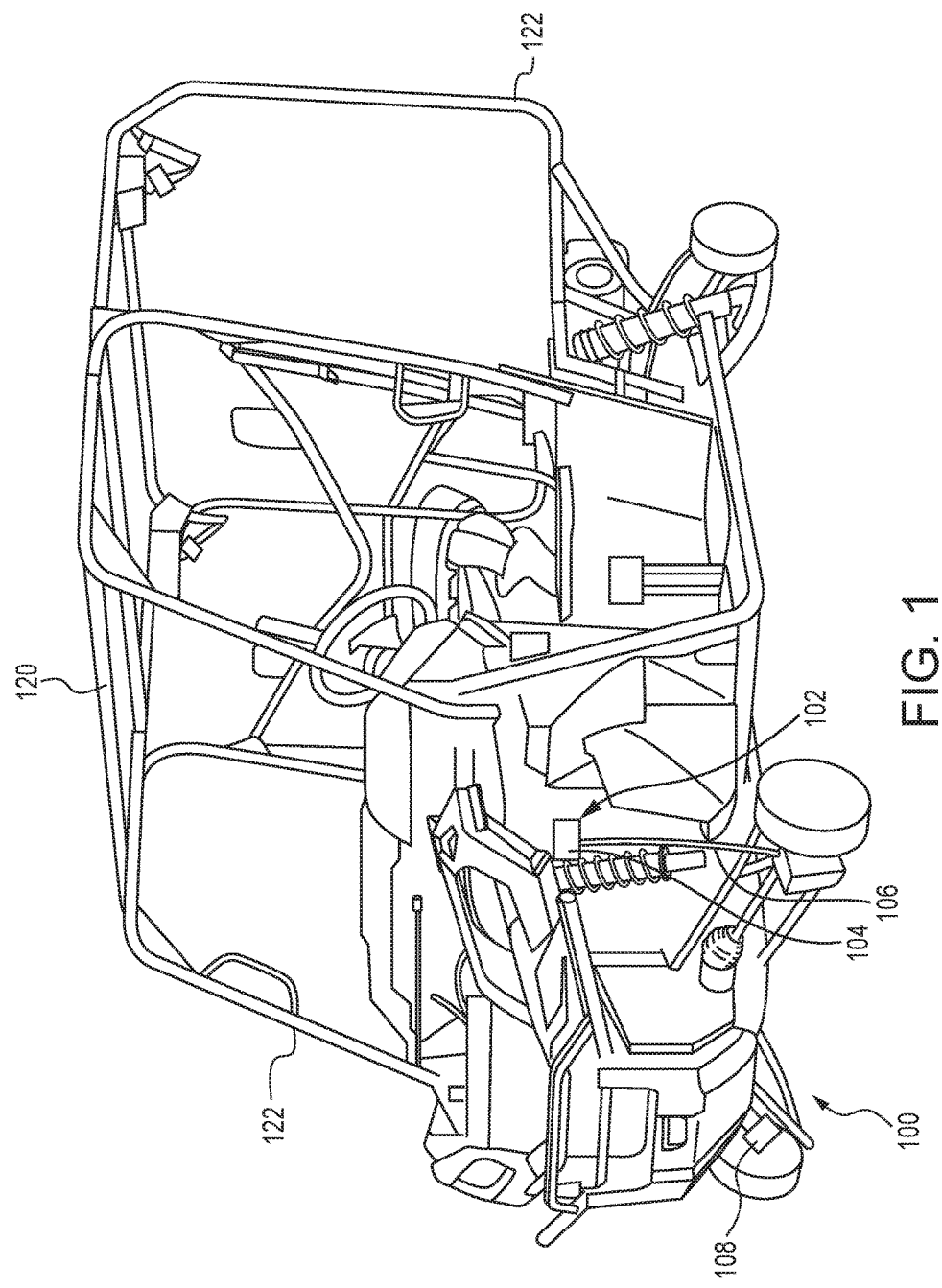
FIG. 1 is a perspective view of a frame of a motor vehicle.
Figure 2:
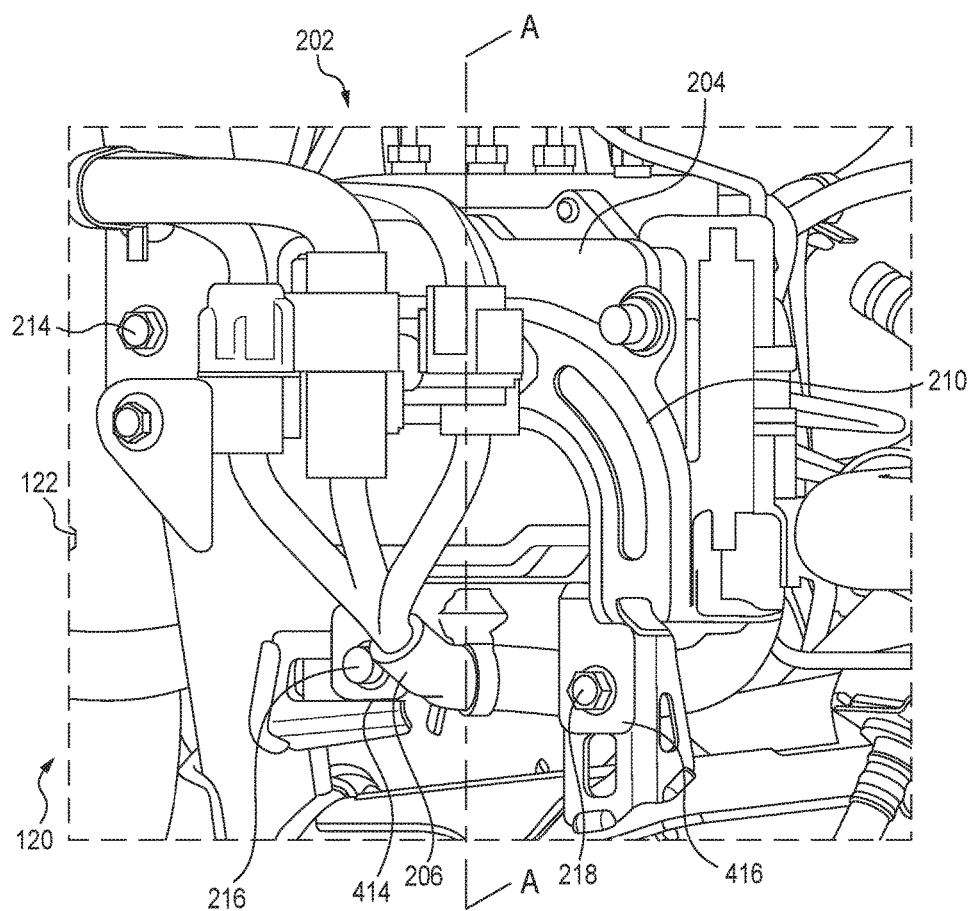
FIG. 2 is view of a component system mounted to the frame of the motor vehicle.

With reference to FIGS. 1 and 2, a frame 120 of motor vehicle 100 is illustrated. The motor vehicle 100 illustrated is commonly described as a side-by-side (SxS) or utility vehicle. The frame 120 is primarily a tubular construction, including a number of tubes 122, preferably made of steel, stainless steel, aluminum, magnesium, or any other suitable material, welded together.

In the embodiment shown, the motor vehicle 100 is designed to include a component system 102, which further includes a central component 104 mounted to one of the metal tubes 122. The central component 104 controls the component system 102. Additionally, the component system may include a wire harness 106 and sensors 108 connected to the central component 104 by wires 110 via the wire harness 106. Data detected by the sensors 108 is fed to the central component 104, which in turn controls or feeds to data to other systems in the motor vehicle 100. The sensors 108 may be located in the front wheel hub 110.

The central component 104, as illustrated, may be located in the front portion 130 of the motor vehicle 100, which is generally forward of the cabin area 132 where operator sits. The engine 134 may be located in a rear portion 136 of the motor vehicle 100, which is located longitudinally behind the front portion 130. In most cases, the engine 134 is located generally near the rear axle 138, which is attached to the rear wheel hubs 140.

Figure 3:
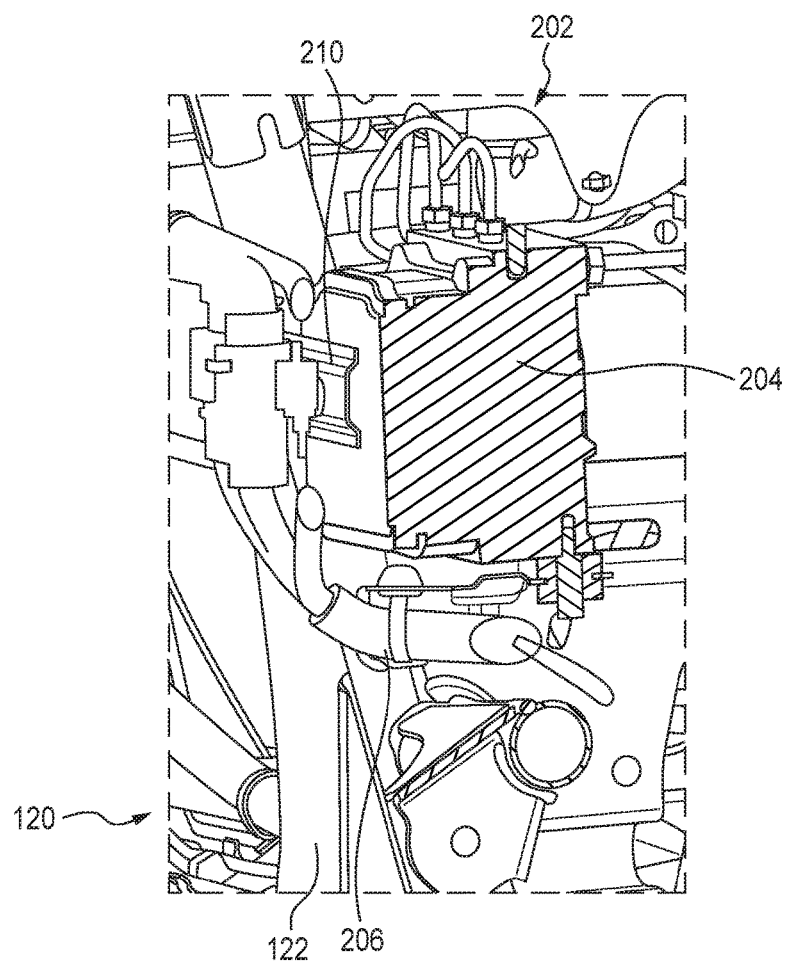
FIG. 3 is a cross section of FIG. 2 along line A-A.
Figure 4:
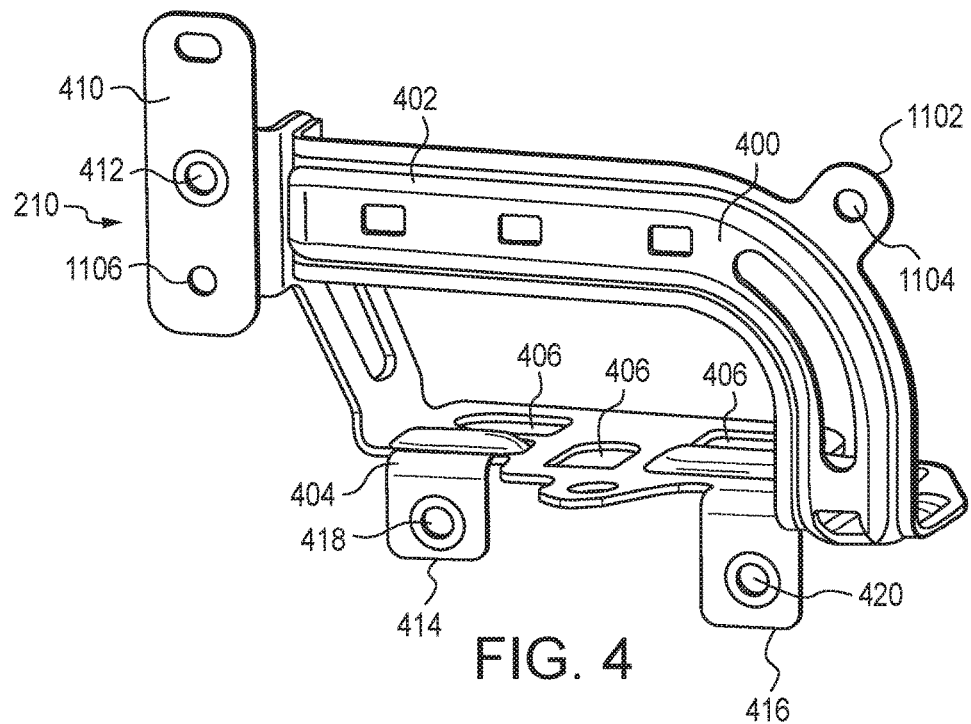
FIG. 4 is a front perspective view of the bracket of FIG. 2.
Figure 5:
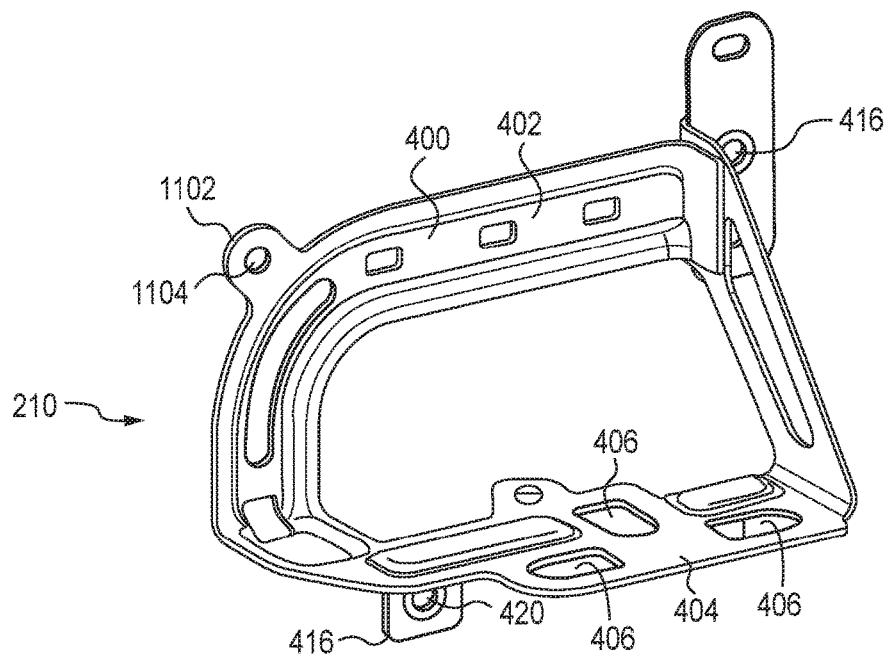
FIG. 5 is a rear perspective view of the bracket of FIG. 2.
Figure 6:
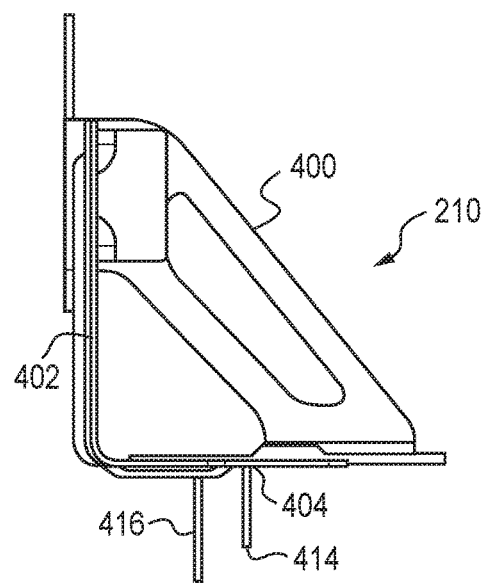
FIG. 6 is a side view of the bracket of FIG. 2.
Figure 7:
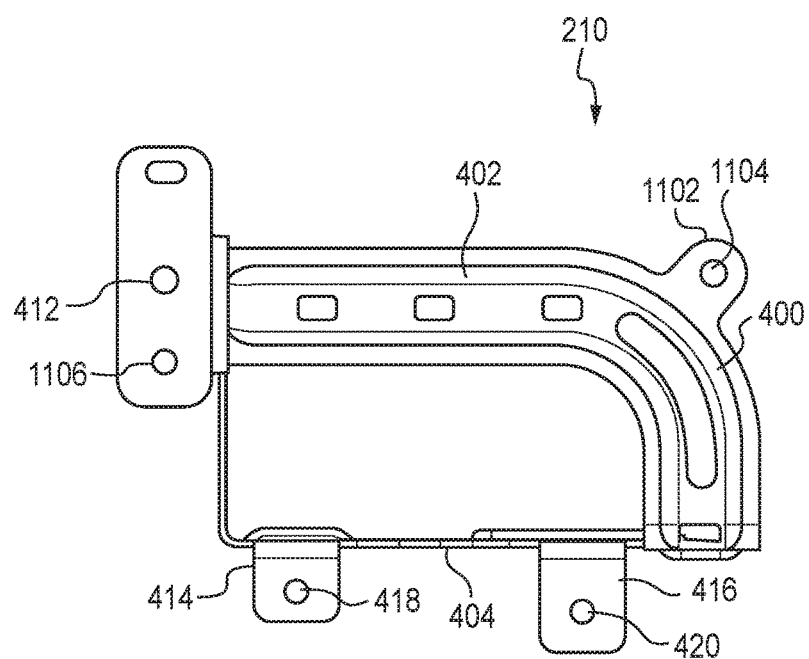
FIG. 7 is a front view of the bracket of FIG. 2.
Figure 8:
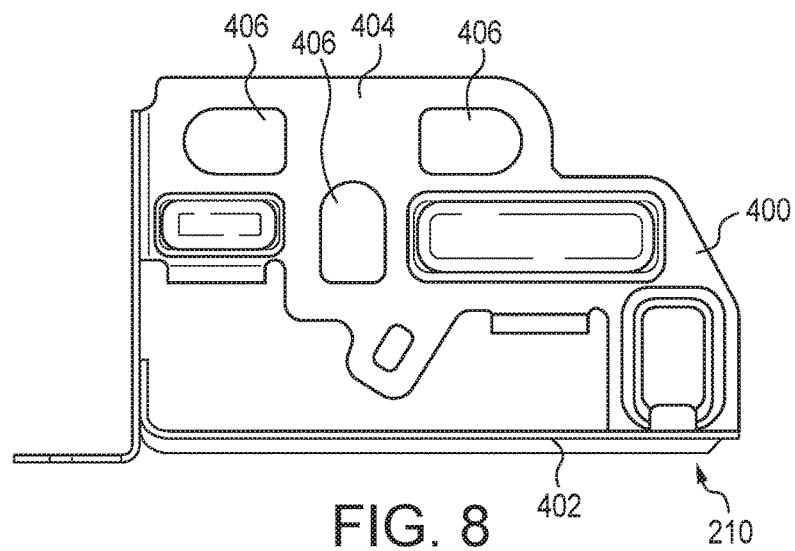
FIG. 8 is a top view of the bracket of FIG. 2.

FIGS. 2 and 3 illustrate a specific example where the component system 102 of FIG. 1 is a brake modulation system 202. The brake modulation system 202 may be brake traction control, electronic brake force distribution, or an anti-lock braking system (ABS). The brake modulation system 202 includes a modulator 204 that controls the activity of the brake modulation system 202 and a wire harness 206 that carries data to and from the modulator 204. The modulator 204 is attached to a bracket 210, which is in turn fixedly attached to one of the tubes 122 of the frame 120.

FIGS. 4-8 further illustrate the bracket 210. The bracket 210 includes a bracket body 400, preferably constructed of steel, stainless steel, aluminum, magnesium, or any other material suitable for receiving the modulator 204. In the embodiment illustrated, the bracket body 400 includes an upper bracket body 402 and a lower bracket body 404. The upper bracket body 402 and lower bracket body 404 may be integrally formed together, may be a single piece folded or molded around on itself with a single weld point, or may be two separate pieces welded together.

Figure 17:
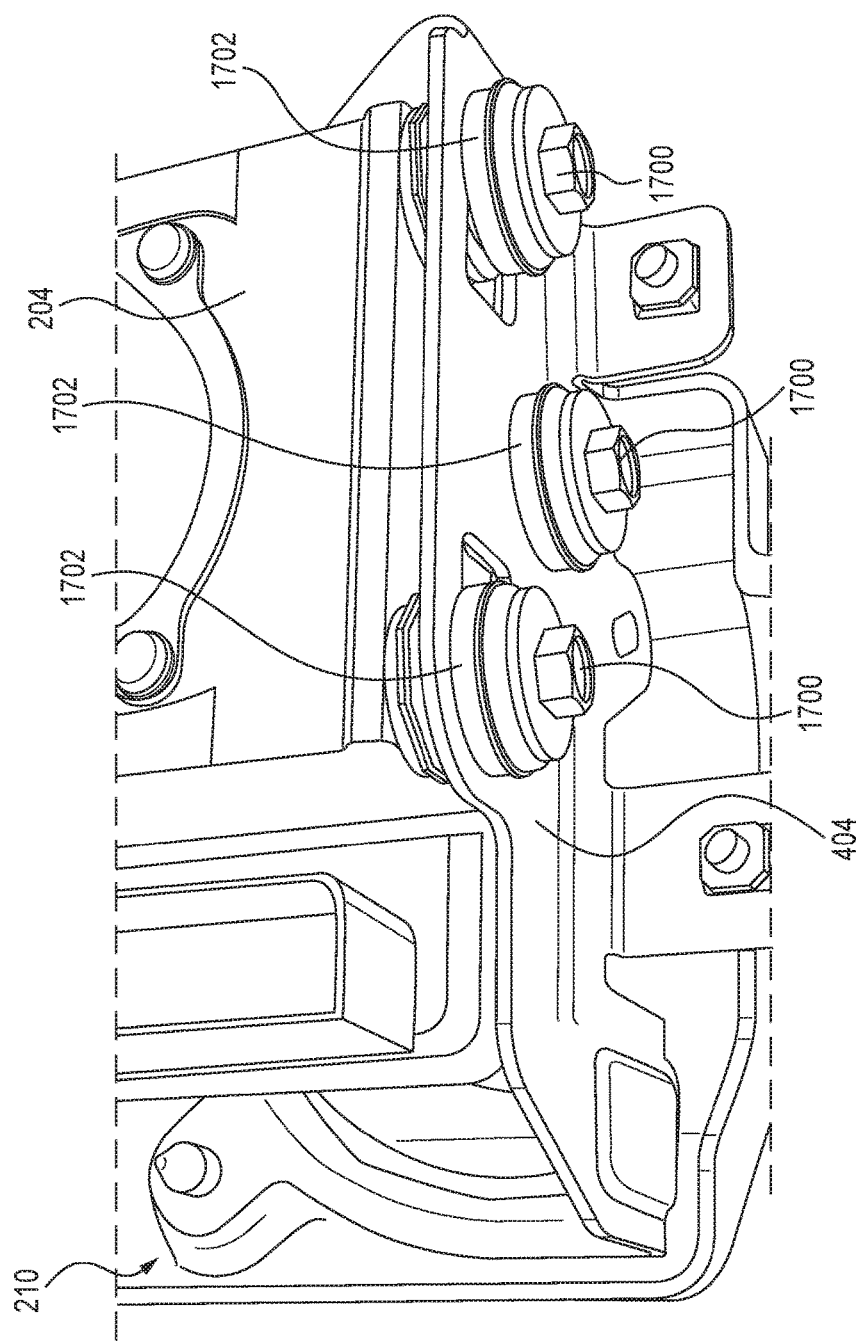
FIG. 17 is a bottom perspective view of an embodiment of a modulator attached to the bracket.

In the embodiment illustrated, the lower bracket body 404 further includes openings 406 for receiving fasteners for attaching the modulator 204 to bracket 210. The modulator 204 may be attached to the lower bracket body 404, as illustrated in FIG. 17, with fasteners such as bolts 1700 and mounting rubbers 1702, although any other suitable fastener known to one skilled in the art may be used.

With continuing reference to FIGS. 4-8, FIGS. 9-10 illustrate the bracket 210 in an attached state and including a first tab 410 that acts as an attachment point for the upper bracket body 402 to one of the tubes 122 of the frame 120. The first tab 410 includes a hole 412 though which fastener 214 may be disposed. The lower bracket body 404, in the illustrated embodiment, includes two lower tabs 414, 416 extending away from the lower bracket body 404 that include holes 418, 420 through which fasteners 216, 218 may be disposed. It should be appreciated the fewer or more tabs may be included as needed, based on the structural environment in the which the bracket 210 is to be placed and the weight of the central component 104 being mounted to the frame 120. Fasteners 214, 216, 218 may be nuts and bolt fasteners, screws, rivets, or any other suitable fastener for joining two pieces of metal together.

Figure 9:
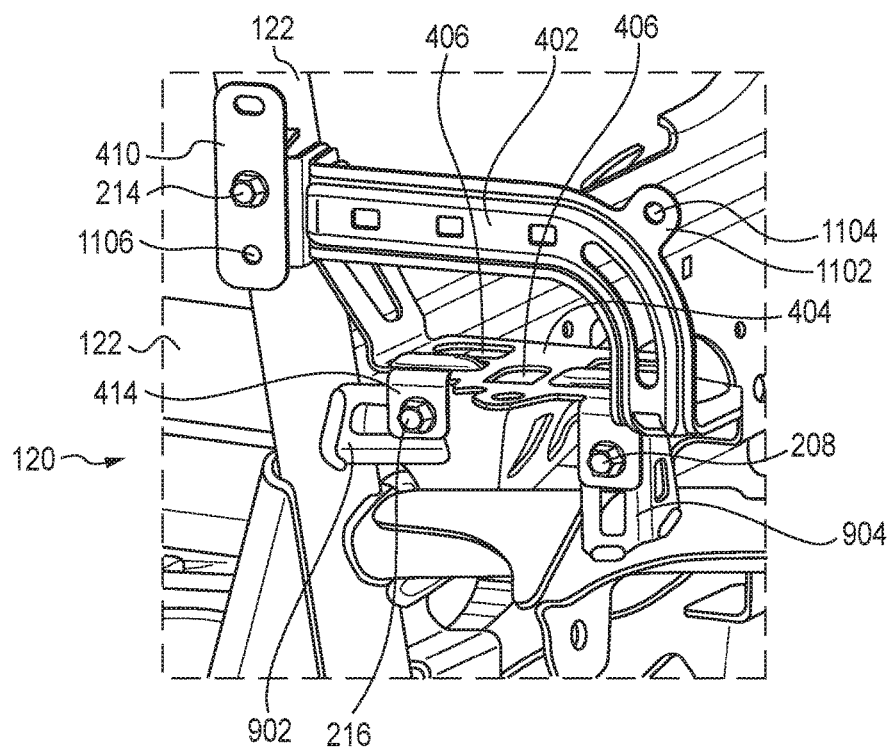
FIG. 9 is a front perspective view of the bracket of FIG. 2 mounted to the frame.
Figure 10:
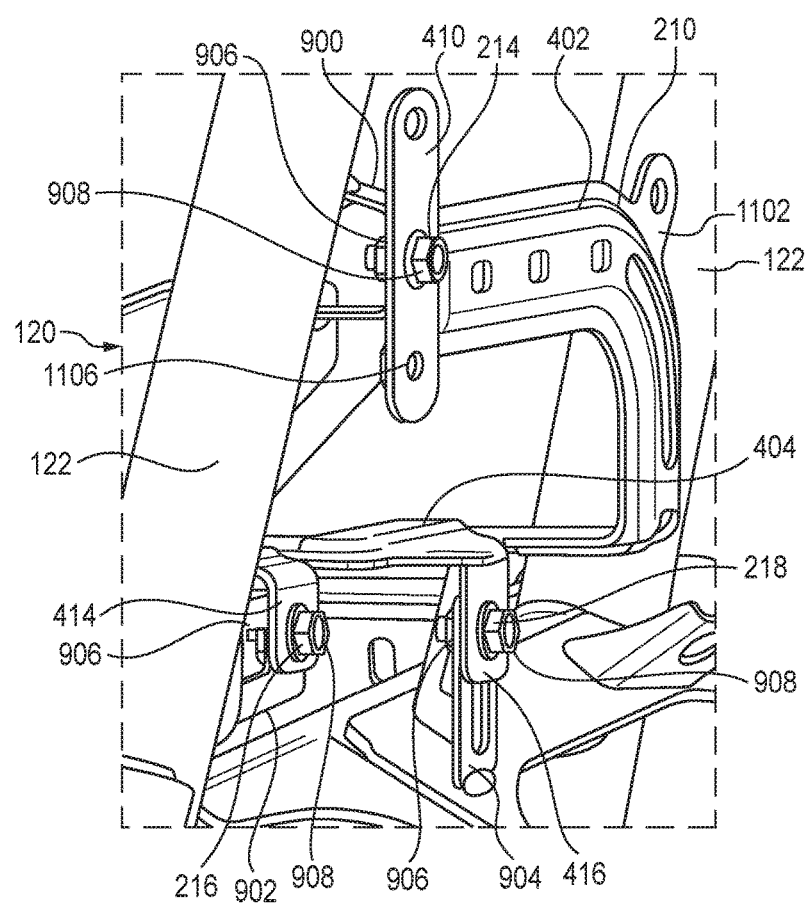
FIG. 10 is a side perspective view of a bracket of FIG. 2 mounted to the frame.
Figure 11:
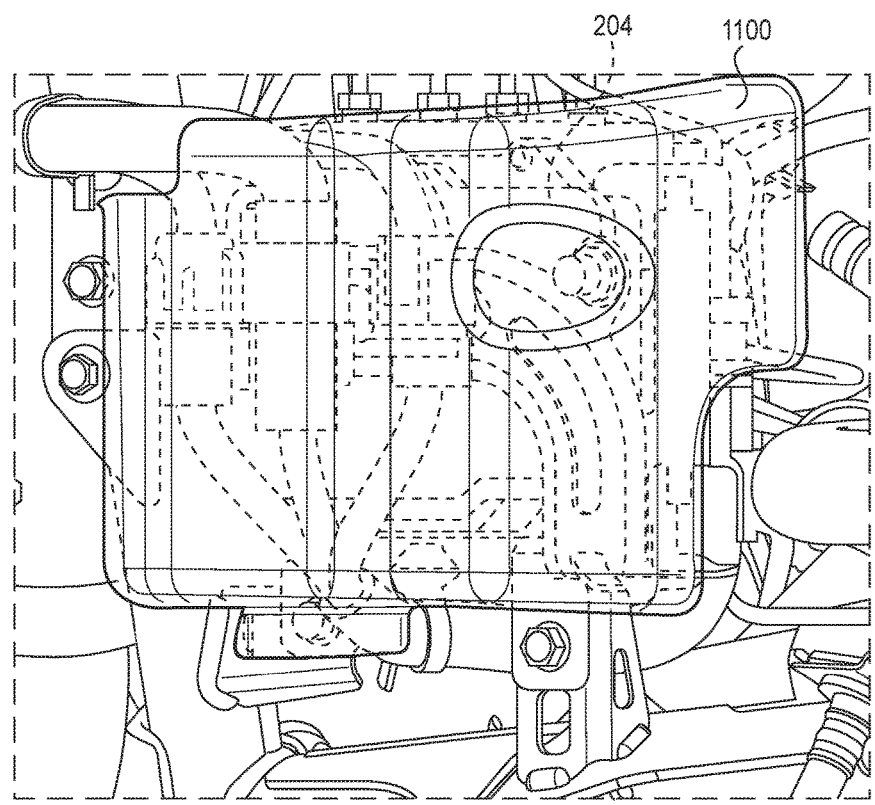
FIG. 11 is view of a component system mounted to the frame of the motor vehicle with a cover.

As illustrated in FIGS. 9 and 10, the first tab 410 and the lower tabs 414, 416 may be attached to extensions 900, 902, 904 that are welded to or formed in the frame 120 to ease the assembly process, particularly if nuts 906 and bolts 908 are used to attach the bracket 210 to the frame 120.

The bracket 210 also includes a cover tab 1102 extending from the upper bracket body 402 with a hole 1104 for receiving a cover 1100, which is further illustrated in FIGS. 11-14. The cover 1100 is attached for the purpose of protecting the central component 104, such as modulator 204 in the illustrated embodiment, from rocks and debris during operation of the motor vehicle 100. The first tab 410 also includes a second hole 1106 for receiving a cover fastener 1108 for attaching the cover 1100.

The cover 1100 is substantially concave in shape with a wall portion 1200 and a lipped edge 1202 so that is does not contact or interfere with the positioning or operation of the central component 104. The gap 1220 between the central component 104 and cover 1100 further prevents any indentations or deformations in the cover 1100 caused by debris from contacting, and thus damaging, the central component 104. The cover 1100 is preferably constructed from any suitable light weight and rigid plastic or composite material known to those skilled in the art.

Figure 12:
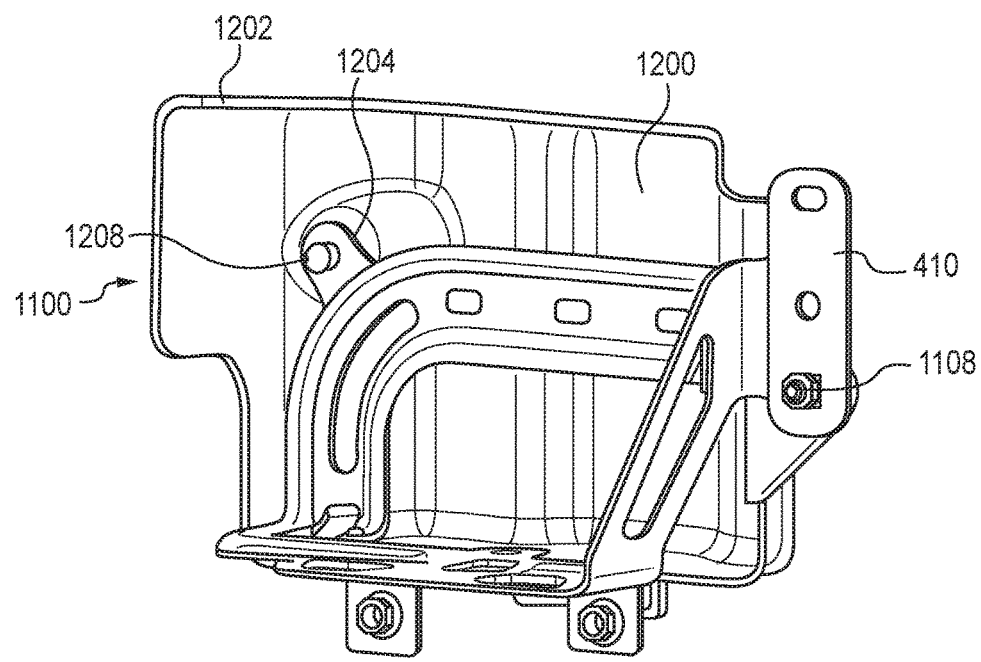
FIG. 12 is a rear perspective view of the bracket and cover.
Figure 13:
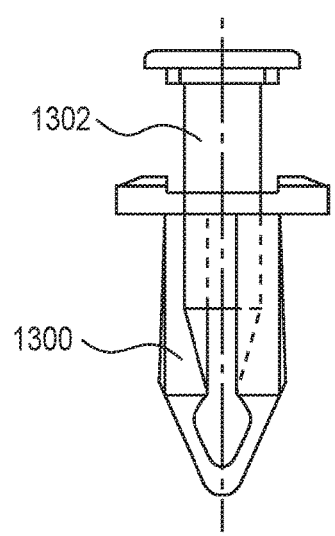
FIG. 13 is a schematic view of an embodiment of a clip for use with bracket.
Figure 14:
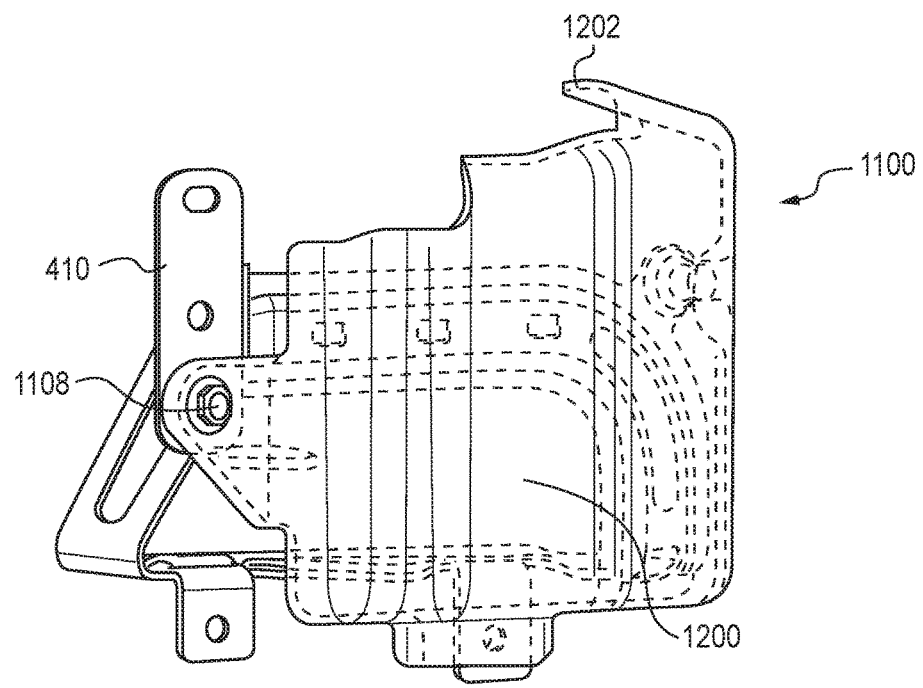
FIG. 14 is a front see-through perspective view of the cover on the bracket.

In the embodiment illustrated in detail in FIGS. 12-13, a fastener 1208 is inserted through hole 1204 in the wall portion 1200. The fastener is further inserted through hole 1104, and an interference fit is created preventing removal of the fastener. In one embodiment, the fastener 1208 may be a mud guard clip as illustrated in FIG. 13. The mud guard clip may include a base 1300 inserted in the hole 1104, and a clip 1302 inserted through hole 1204 into the base 1300, which secures the cover 1100 to the bracket 210.

The cover 1100 has a tab 1300 extending from the wall portion 1200 that corresponds with the first tab illustrated in FIGS. 12-15. The cover 1100 is attached by a cover fastener 1108 inserted through a hole in either the first tab 410, which may be any suitable fastener for attaching plastic to metal, such a nut and bolt fastener, a screw, a rivet, or any other suitable fastener.

Figure 16:
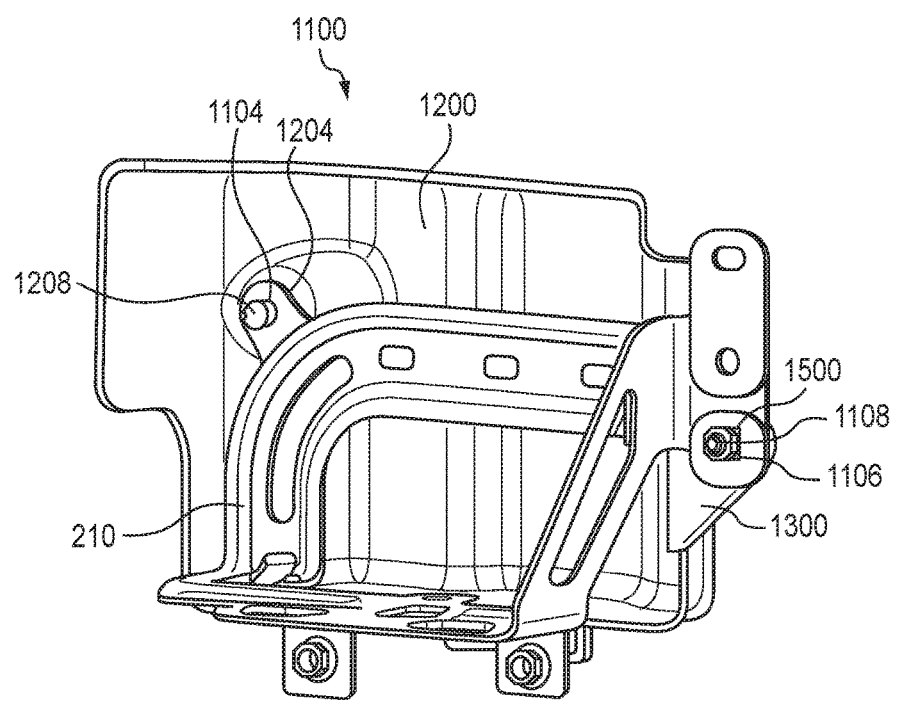
FIG. 16 is a rear perspective view of an alternate embodiment of the bracket and cover.

In an alternate embodiment illustrated in FIG. 16, the bracket 210 may include a separate second cover tab 1106 for receiving a cover fastener 1108 for securing the cover 1100.

Figure 15:
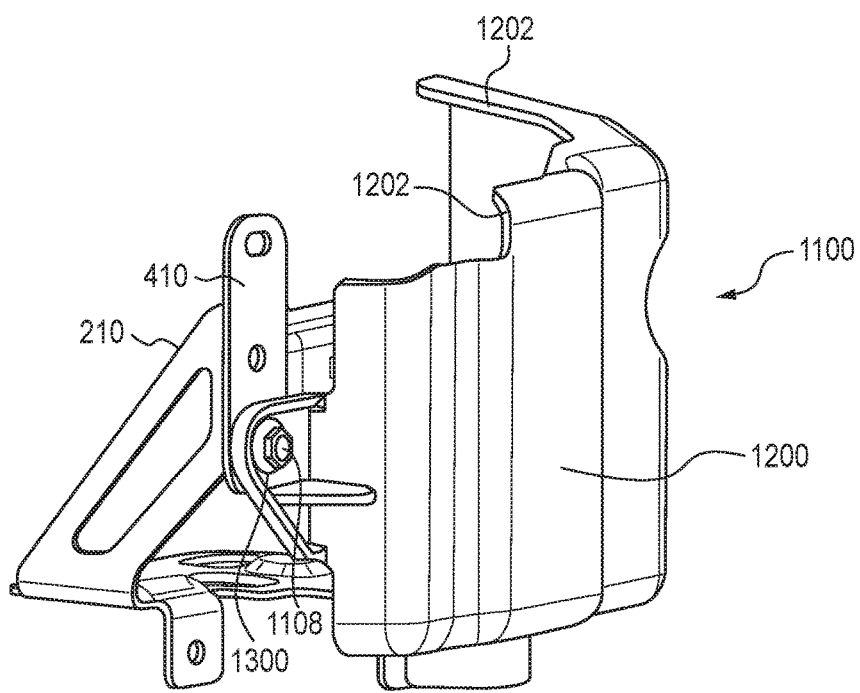
FIG. 15 is a front perspective view of the bracket and cover.

The cover 1100 has a tab 1300 extending from the wall portion 1200 that corresponds with the second cover tab 1106 illustrated in FIG. 15. The cover 1100 is attached by a cover fastener 1108 inserted through a hole 1500 in the tab 1300 illustrated in FIG. 16, which may be any suitable fastener for attaching plastic to metal, such a nut and bolt fastener, a screw, a rivet, or any other suitable fastener.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A motor vehicle having a tubular frame, an engine, and a brake modulation system comprising sensors and a modulator, comprising:
   a bracket, comprising:
   a bracket body;
   at least one body attachment point, the at least one body attachment point comprising:
   a first body tab extending from the bracket and having a first hole there through for receiving the first bracket fastener; and
   a second body tab extending from the bracket and having a second hole there through for receiving the second bracket fastener; and
   at least one bracket fastener for attaching the bracket body to the tubular frame at the at least one body attachment point, the at least one bracket fastener comprising:
   a first bracket fastener; and
   a second bracket fastener;
   a cover, comprising:
   a cover body;
   at least one cover attachment point, the at least one cover attachment point comprising:
   a first cover tab extending from the bracket and having a first hole there through for receiving the first cover fastener;
   a second cover tab extending from the bracket and having a second hole there through for receiving the second cover fastener; and at least one cover fastener for attaching the cover body to the bracket at the at least one cover attachment point, the at least one cover fastener comprising:
a first cover fastener; and
a second cover fastener;

wherein the modulator is attached to the bracket and is covered by the cover; and wherein the first body tab and the first cover tab are integrally formed.

2. The motor vehicle of claim 1 wherein:
the at least one bracket fastener comprises:
a third bracket fastener; and
the at least one body attachment point comprises:
a third body tab extending from the bracket and having a third hole there through for receiving the third bracket fastener.

3. A motor vehicle having a tubular frame, an engine, and a component system comprising a harness and a component, comprising:
a bracket comprising:
a bracket body;
at least one body attachment point comprising:
a first body tab extending from the bracket and having a first hole there through for receiving the first bracket fastener; and
a second body tab extending from the bracket and having a second hole there through for receiving the second bracket fastener; and
at least one bracket fastener for attaching the bracket body to the tubular frame at the at least one body attachment point comprising:
a first bracket fastener;
a second bracket fastener; and
a cover attached to the bracket for covering the component comprising:
a cover body;
at least one cover attachment point comprising:
a first cover tab extending from the bracket and having a first hole there through for receiving the first cover fastener; and
a second cover tab extending from the bracket and having a second hole there through for receiving the second cover fastener; and
at least one cover fastener for attaching the cover body to the bracket at the at least one cover attachment point comprising:
a first cover fastener; and
a second cover fastener;

wherein the first body tab and the first cover tab are integrally formed.

4. The motor vehicle of claim 3 wherein:
the at least one bracket fastener comprises:
a third bracket fastener; and
the at least one body attachment point comprises:
a third body tab extending from the bracket and having a third hole there through for receiving the third bracket fastener.

5. The motor vehicle of claim 3 wherein the component is attached to the bracket and is covered by the cover.

6. The motor vehicle of claim 3 wherein the component is attached to the tubular frame and is covered by the cover.

7. The motor vehicle of claim 3 wherein the at least one bracket fastener comprises at least one nut and bolt assembly and the at least one cover fastener comprises at least one nut and bolt assembly.

8. The motor vehicle of claim 3 wherein the at least one cover fastener comprises at least one interference fit fastener.

9. The motor vehicle of claim 3 further comprising a gap between the component and the cover.

10. The motor vehicle of claim 9 wherein the harness is disposed between the component and the cover.

* * * * *